United States Patent

Bullerdick

[11] Patent Number: 5,924,514
[45] Date of Patent: Jul. 20, 1999

[54] AUXILIARY FUEL TANK FOR A SNOWMOBILE

[76] Inventor: Christian Wayne Bullerdick, P.O. Box 9, Norland, Ontario, Canada, K0M 2L0

[21] Appl. No.: 08/939,409

[22] Filed: Sep. 29, 1997

[51] Int. Cl.$^6$ .................................................. B60K 15/03
[52] U.S. Cl. ............................................ 180/314; 280/835
[58] Field of Search ............................. 180/314; 280/834, 280/835

[56] References Cited

U.S. PATENT DOCUMENTS

| | | | |
|---|---|---|---|
| 2,563,981 | 8/1951 | Walker | 280/834 |
| 3,512,795 | 5/1970 | Naeve | 280/479.1 |
| 4,396,084 | 8/1983 | Yoshimura et al. | 280/219 |
| 4,469,190 | 9/1984 | Yamaguchi | 280/835 |
| 4,577,719 | 3/1986 | Nomura et al. | 280/835 |
| 4,653,762 | 3/1987 | Nakamura et al. | 280/835 |
| 5,388,660 | 2/1995 | Shirasagi et al. | 280/835 |

*Primary Examiner*—Kenneth R. Rice
*Attorney, Agent, or Firm*—George A. Seaby

[57] ABSTRACT

An auxiliary fuel tank for a snowmobile is detachably secured to the clutch guard of the snowmobile so that the tank is as remote as possible from heat producing elements of the snowmobile while being readily accessible when the cowling covering the engine is opened.

3 Claims, 5 Drawing Sheets

AUXILIARY FUEL TANK FOR A SNOWMOBILE

FIELD OF THE INVENTION

The present invention relates to an auxiliary fuel tank, and in particular to an auxiliary fuel tank for a snowmobile.

BACKGROUND OF THE INVENTION

Auxiliary fuel tanks merely provide additional fuel for use when the main tank is empty. The use of auxiliary fuel tanks for extending the range of a vehicle is well known.

Most prior art auxiliary fuel tanks are used in motorized vehicles. In this connection, reference is made to U.S. Pat. No. 2,563,981, which issued to Walker on Aug. 14, 1951, describing an auxiliary fuel tank for use in an automobile. Other patents relating to auxiliary fuel tanks include U.S. Pat. No. 4,396,084, which issued to Yoshimura et al. on Aug. 2, 1973, and U.S. Pat. No. 3,512,795, which issued to Naeve et al. on May 19, 1970. The Yoshimura et al. patent describes an auxiliary fuel tank for use in a motorcycle, and the Naeve et al. patent relates to a tank for use on a tractor. None of the patented auxiliary fuel tanks is adapted for use in a snowmobile.

SUMMARY OF THE INVENTION

The object of the present invention is to provide an auxiliary fuel tank for a snowmobile which is readily accessible, and which is remote from the heat generating portion of the engine.

Accordingly, the invention relates to an auxiliary fuel tank system for a snowmobile, which includes a casing defining a hot area containing an engine, a main fuel tank, a main fuel line connecting the main fuel tank to the engine, a pump in the main fuel line and a main valve in the main fuel line, and a cold area containing a drive train and a clutch guard, the auxiliary fuel tank system comprising a tank mounted on the clutch guard in the cold area and remote from the hot area. Preferably, the system includes an auxiliary fuel line which connects the auxiliary fuel tank to the main fuel line so that the fuel is automatically drawn from the auxiliary fuel tank to the engine upon closing of the main fuel valve; and an auxiliary fuel valve in the auxiliary fuel line which is mounted in a console of the snowmobile for easy access by the driver of the vehicle.

The advantage of the present invention is that it provides an auxiliary fuel tank for a snowmobile which is located in a readily accessible area while being protected from external forces and spaced apart from the heat generating portion of the engine. In addition to being located in a readily accessible area, the auxiliary tank of the present invention is also located in an area where it does not block or obstruct other elements in the engine chamber.

BRIEF DESCRIPTION OF THE DRAWINGS

A preferred embodiment of the present invention is described below with reference to the accompanying drawings, in which.

DETAILED DESCRIPTION

Figure 1:
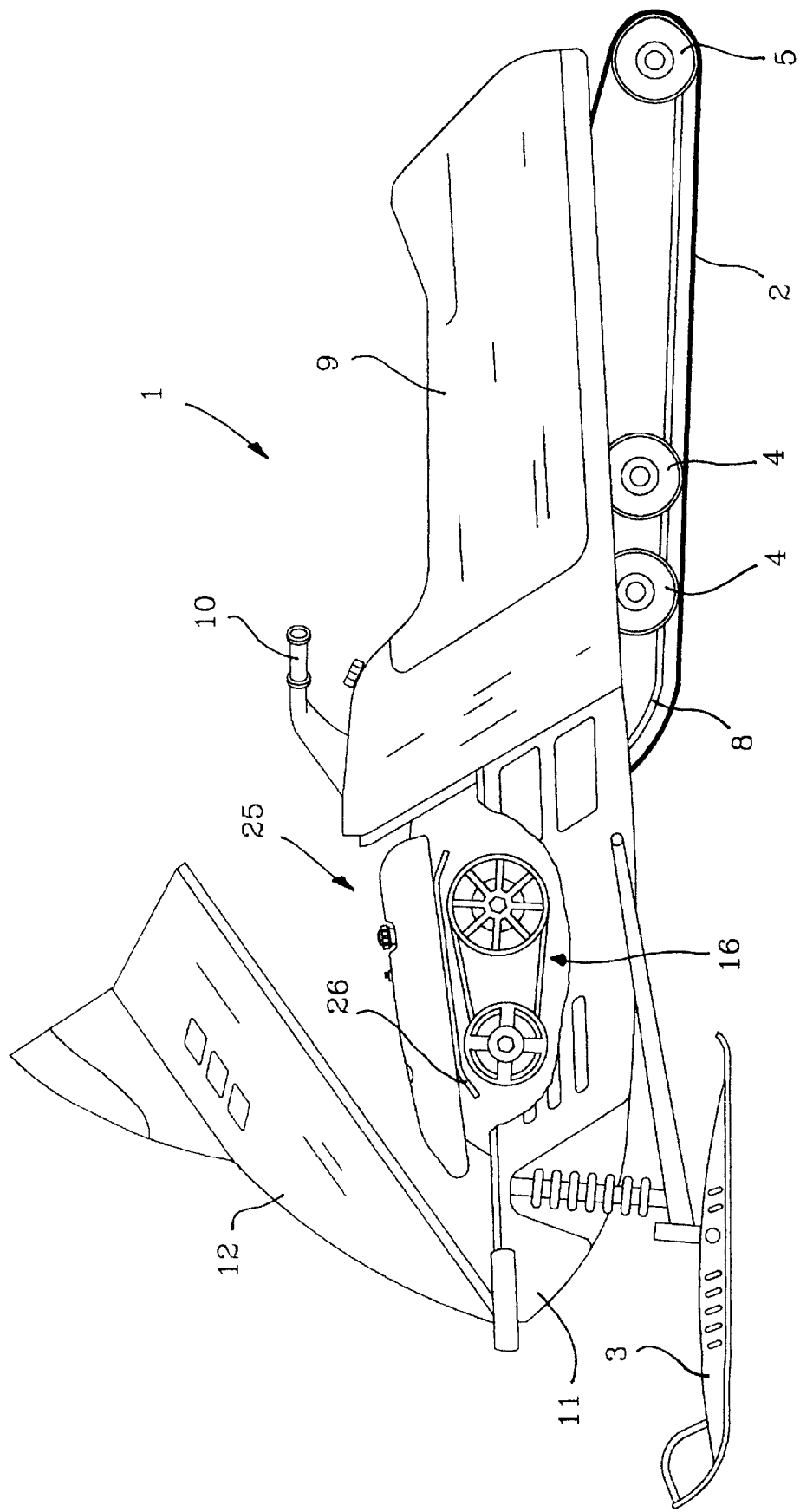
FIG. 1 is a schematic, partly sectioned side view of a snowmobile incorporating an auxiliary fuel tank in accordance with the present invention.
Figure 2:
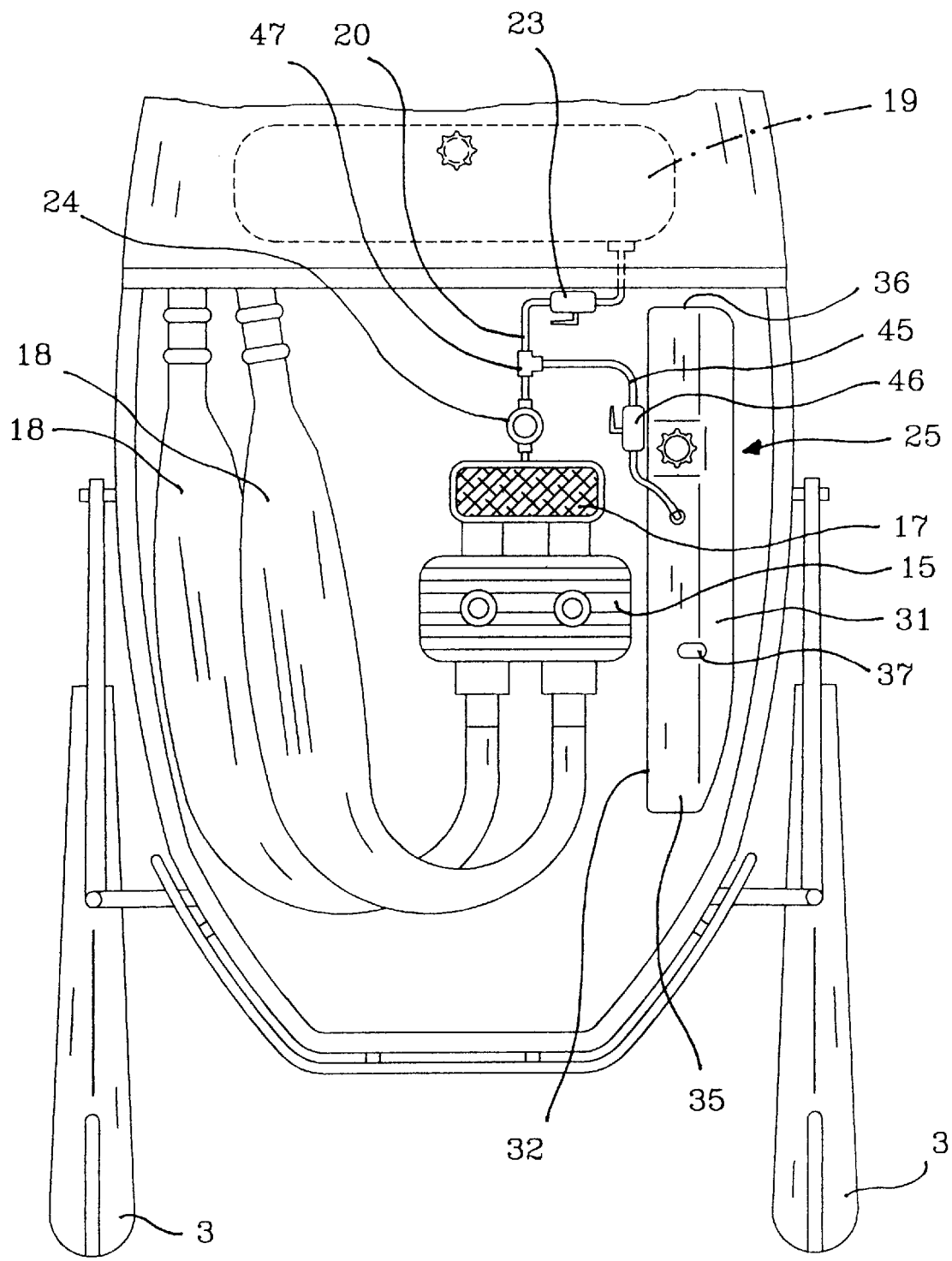
FIG. 2 is a schematic plan view of the front end of the snowmobile and the auxiliary fuel tank of FIG. 1.

Referring to FIGS. 1 and 2, a conventional snowmobile includes a body generally indicated at 1, the rear end of which is supported by an endless belt 2, and the front end of which carries a pair of skis 3. The belt 2 extends around sprockets 4 and 5, and a rail 8 for driving the snowmobile. A seat 9 and handlebars 10 are also provided on the rear end of the snowmobile. The front end of the body 1 includes a lower tray 11 and a cowling 12 which define a compartment or chamber containing an engine 15 (FIG. 2). The engine 15 is connected to the belt 2 by a transmission including a clutch assembly 16. The engine 15 receives air and fuel from a carburetor/air filter assembly 17, and engine exhaust is discharged from the engine via exhaust pipes 18. Gasoline is fed to the assembly 17 from a main fuel tank 19, via a main fuel line 20 containing a valve 23 and a pump 24. The area in the vicinity of the engine 15 is normally hot, and the area above the clutch assembly 16 remains relatively cold even during operation of the snowmobile.

Figure 3:
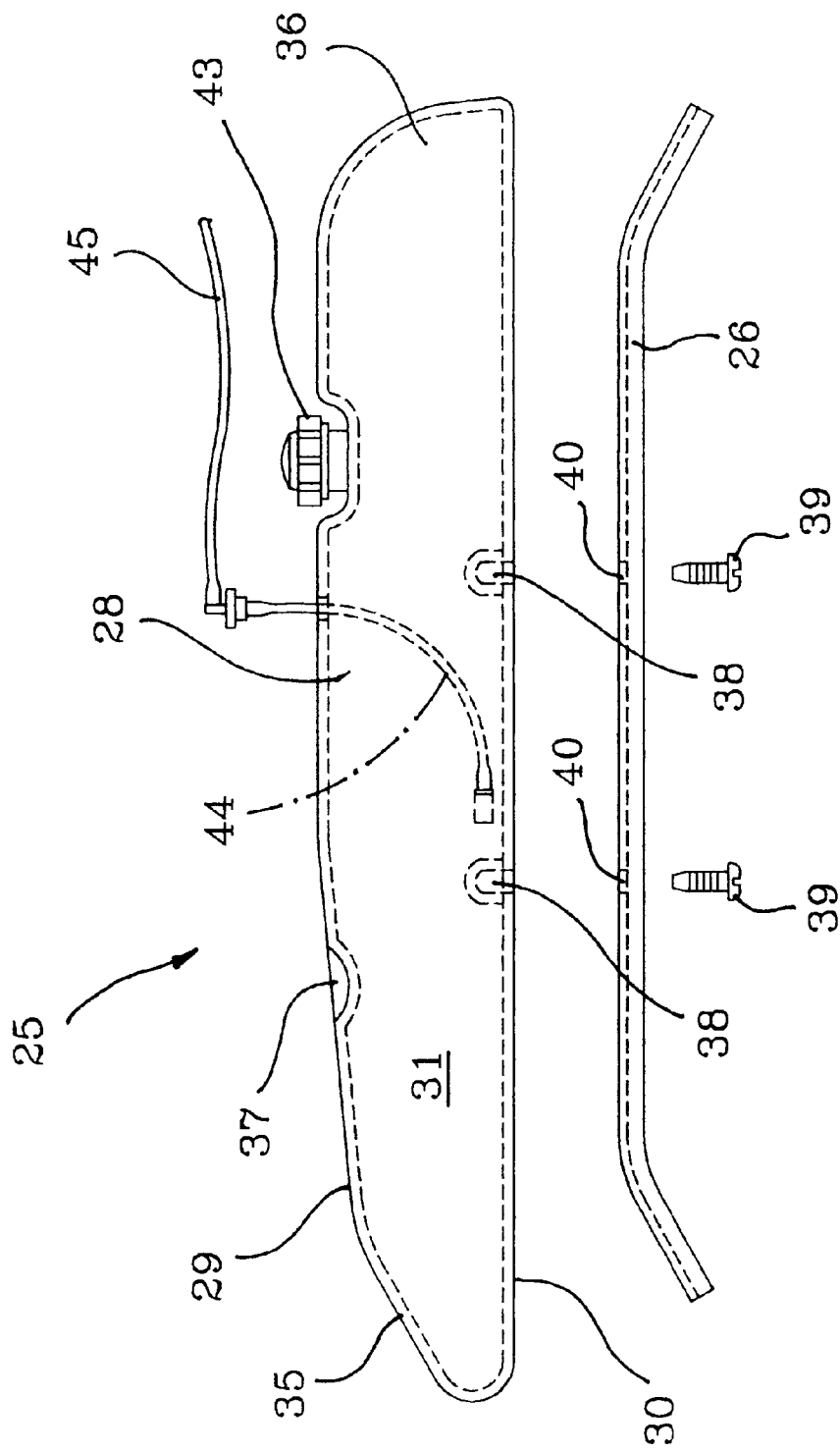
FIG. 3 is an exploded side view of the fuel tank and the clutch guard of FIGS. 1 and 2.

In accordance with the present invention, an auxiliary fuel tank generally indicated at 25 is mounted in the cold area, i.e. on a clutch guard 26 above the clutch assembly 16. As best shown in FIGS. 2 and 3, the auxiliary fuel tank 25 includes an elongated hollow body 28 defined by a top wall 29, a bottom wall 30, side walls 31 and 32, and end walls 35 and 36. The top wall 29 is generally rectilinear, and the ends 35 and 36 slope downwardly therefrom. A concave recess 37 is provided near the front end of the top wall 29 for conforming the shape of the top wall to that of the interior of the cowling 12. The slope of the front end 35 is designed to conform to the interior of the cowling 12. The top end of the outer side wall 31 slopes away from the top wall for conforming to the shape of the cowling 12.

The side wall 32 adjacent the engine 15 is vertical, i.e. perpendicular to the top wall 29. The bottom wall 30 is flat and includes a pair of inserts 38 for receiving bolts 39 to secure the body 1 to the clutch guard 26. Holes 40 which receive the bolts 39 are normally produced during manufacture of the clutch guard 26, but can be drilled immediately prior to mounting of the fuel tank on the guard. Fuel is introduced into the tank via a top opening which is closed by a cap 43. The fuel is discharged via a tube 44 extending through the top wall 29 to an auxiliary fuel line 45. The fuel line 45, which contains an auxiliary valve 46, is connected to the main fuel line 20 by a tee 47 (FIGS. 2 and 7).

The fuel tank described above is designed specifically for use in a model S-2000 Bombardier Formula 500 Ski-Doo™ manufactured by Bombardier Inc., Valcourt, Québec. The size and shape of the tank will depend on the model of snowmobile, i.e. upon the size and shape of the cold area above the clutch guard. Maximum fuel capacity is achieved by maximizing the use of the space available in the cold area.

Figure 4:
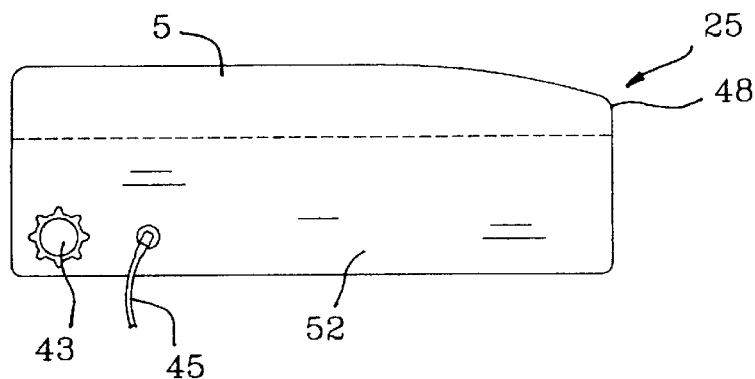
FIG. 4 is a top view of a second embodiment of the auxiliary fuel tank.
Figure 5:
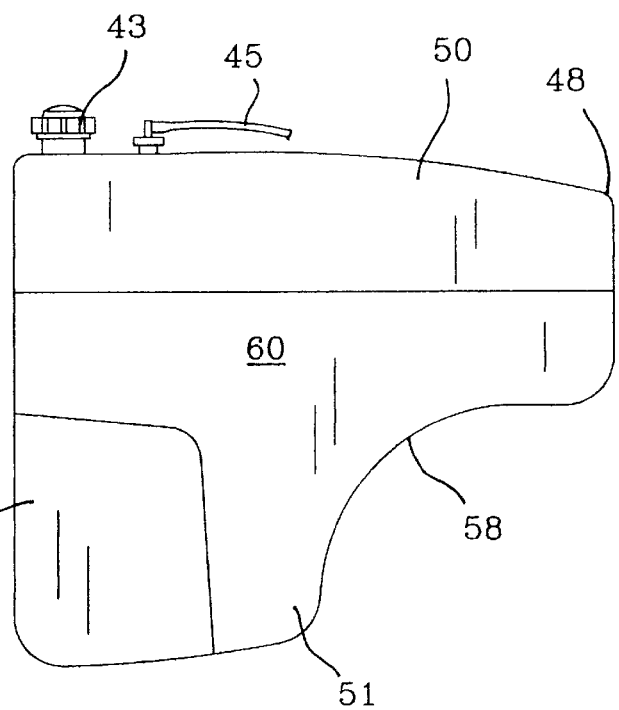
FIG. 5 is a side view of the fuel tank of FIG. 4.
Figure 6:
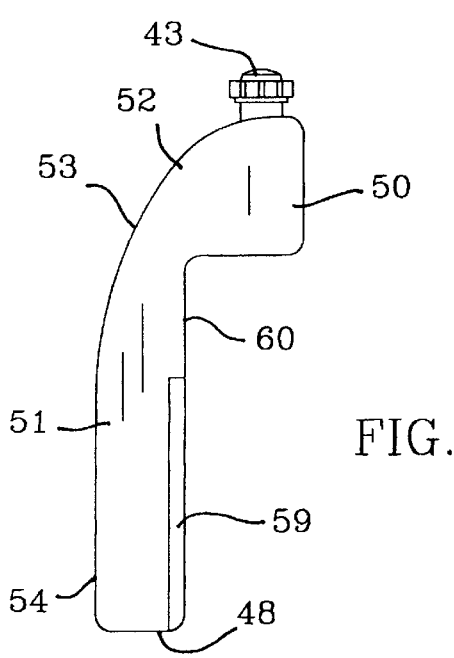
FIG. 6 is an end view of the fuel tank of FIGS. 4 and 5.

FIGS. 4 to 6 illustrate another embodiment of the invention which is adapted to the model 700XCR manufactured by Polaris Industries. The fuel tank of FIGS. 4 to 6 includes a body 48 having generally inverted L-shaped when viewed from the end. The body 48 includes upper and lower sections 50 and 51, the upper section 50 being generally rectangular with arcuate top and side walls 52 and 53 curving downwardly to the vertical outer side wall 54 of the lower section 51. The lower section 51 is also generally rectangular with a large concave notch 58 in one end thereof and a generally rectangular notch 59 in the planar inner wall 60 thereof for conforming the shape of the body 48 to the space available in the cold area of the snowmobile engine compartment.

Figure 7:
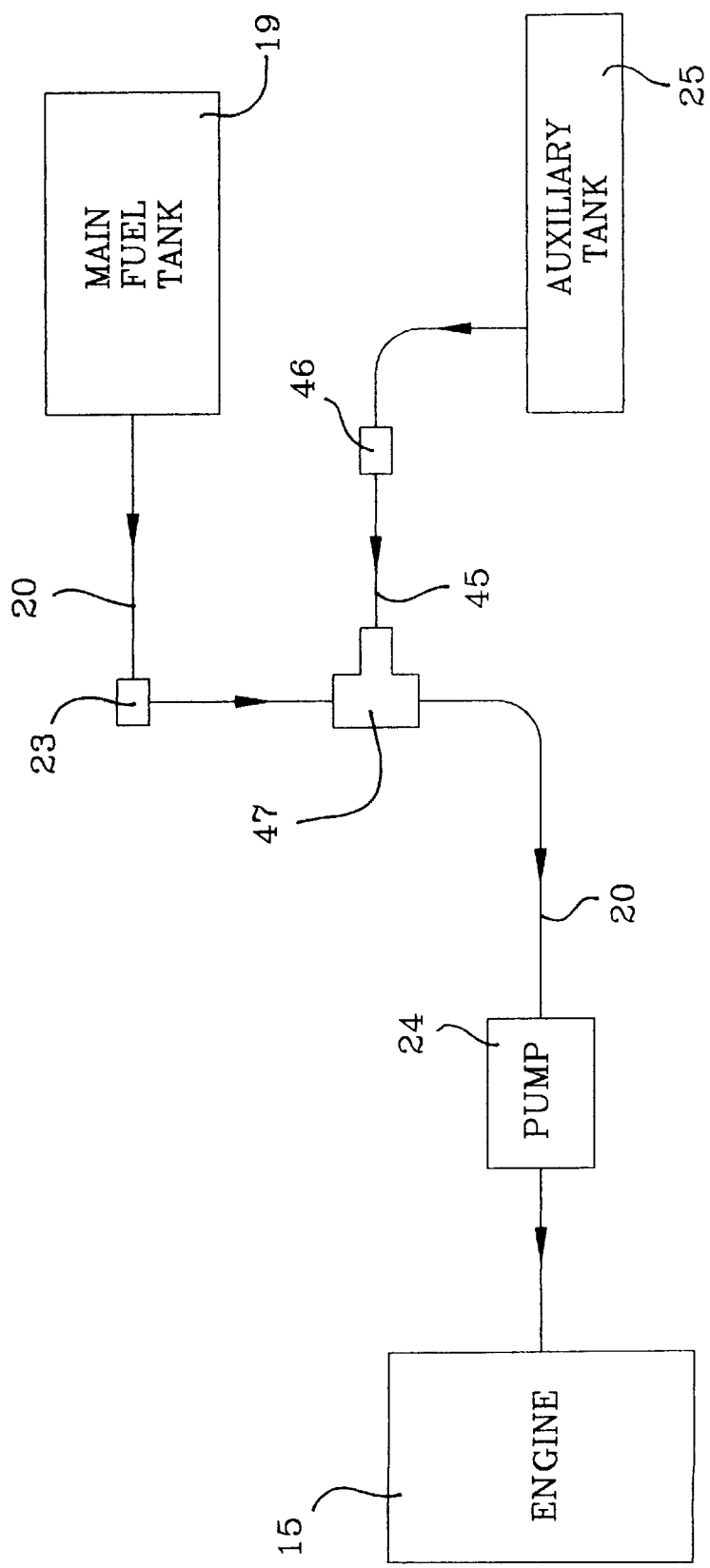
FIG. 7 is a block diagram of a fuel supply system incorporating the auxiliary fuel tank of FIGS. 2 and 3.

Referring to FIGS. 2 and 7, a fuel supply system incorporating an auxiliary tank 25, includes the tee 47 in the main fuel line 20 connecting the main fuel tank 19 to the engine 15. The tee 47 is inserted between the main fuel valve 23 and the pump 24 so that fuel is automatically drawn from the auxiliary fuel tank 25 when the main valve 23 is closed and the auxiliary valve 46 is opened. The tee 47 receives the auxiliary fuel line 45 from the auxiliary fuel tank 25. The auxiliary valve 46 is mounted in the console of the snowmobile for easy access by the driver of the vehicle.

The embodiment of the invention in which an exclusive property or privilege is claimed are defined as follows:

1. An auxiliary fuel tank system for a snowmobile, which includes a casing defining a hot area containing an engine, a fuel pump, a main fuel tank, a main fuel line connecting the main fuel tank to the engine, a pump in the main fuel line and a main valve in said main fuel line, and a cold area containing a drive train and a clutch guard, the auxiliary fuel tank system comprising a tank mounted on the clutch guard in the cold area and remote from the hot area.

2. A system according to claim 1, including an auxiliary fuel line connecting the auxiliary fuel tank to the main fuel line between said pump and valve so that fuel is automatically drawn from the auxiliary fuel tank upon closing said main valve.

3. A system according to claim 2, including an auxiliary valve in said auxiliary fuel line, said auxiliary valve being mounted in a console of the snowmobile.

* * * * *